US007815241B2

(12) United States Patent
Renke et al.

(10) Patent No.: US 7,815,241 B2
(45) Date of Patent: Oct. 19, 2010

(54) GOOSENECK HINGE ASSEMBLY FOR VEHICLES

(75) Inventors: David T. Renke, Macomb, MI (US); Jeffrey D. Heath, Orion, MI (US); Martin R. Manley, West Bloomfield, MI (US); Andrew R. McIntyre, Midland (CA); Robert A. Woods, Cookeville, TN (US)

(73) Assignee: GM Global Technology Operations, Inc., Detroit, MI (US)

( * ) Notice: Subject to any disclaimer, the term of this patent is extended or adjusted under 35 U.S.C. 154(b) by 807 days.

(21) Appl. No.: 11/421,087

(22) Filed: May 31, 2006

(65) Prior Publication Data

US 2006/0279105 A1 Dec. 14, 2006

Related U.S. Application Data

(60) Provisional application No. 60/690,227, filed on Jun. 14, 2005.

(51) Int. Cl.
*E05D 11/06* (2006.01)
*B62D 25/12* (2006.01)

(52) U.S. Cl. ........................ 296/146.11; 296/76; 16/375

(58) Field of Classification Search ............ 296/146.11, 296/76, 146.1, 146.12; 16/374, 375, 321, 16/221

See application file for complete search history.

(56) References Cited

U.S. PATENT DOCUMENTS

| | | | | | |
|---|---|---|---|---|---|
| 2,810,153 | A | * | 10/1957 | Semar | 16/308 |
| 3,643,755 | A | * | 2/1972 | Gionet et al. | 180/69.21 |
| 4,186,476 | A | * | 2/1980 | Mair et al. | 29/407.1 |
| 5,243,738 | A | | 9/1993 | Kiefer | |
| 5,361,455 | A | * | 11/1994 | Kiefer | 16/235 |
| 5,664,289 | A | * | 9/1997 | Wolda et al. | 16/298 |
| 5,873,619 | A | * | 2/1999 | Lewkoski et al. | 296/76 |
| 6,382,704 | B1 | * | 5/2002 | Nastasoiu | 296/146.11 |

FOREIGN PATENT DOCUMENTS

| | | |
|---|---|---|
| DE | 19731767 A1 | 3/1998 |
| DE | 10249468 A1 | 5/2004 |

* cited by examiner

*Primary Examiner*—Glenn Dayoan
*Assistant Examiner*—Gregory Blankenship

(57) ABSTRACT

A gooseneck hinge assembly for a closure of a vehicle includes a body side strap adapted to be connected to a vehicle body of the vehicle and a closure side strap having a gooseneck shape adapted to be connected to a closure for closing an opening in the vehicle body. The gooseneck hinge assembly also includes a pivot pin pivotally connecting the closure side strap and the body side strap to allow rotational movement therebetween. The gooseneck hinge assembly further includes a wedge bumper interconnecting the body side strap and the closure side strap to allow the decklid to free rise to a fully open position and to dampen an impact of the closure side strap.

12 Claims, 3 Drawing Sheets

GOOSENECK HINGE ASSEMBLY FOR VEHICLES

CROSS REFERENCE TO RELATED APPLICATION

This application claims the benefit of copending U.S. Provisional Ser. No. 60/690,227, filed Jun. 14, 2005.

TECHNICAL FIELD

The present invention relates generally to hinges for vehicles and, more particularly, to a gooseneck hinge assembly for a vehicle.

BACKGROUND OF THE INVENTION

It is known to provide a closure such as a decklid for a vehicle to open and close a rear compartment or trunk of a vehicle body of the vehicle. Typically, the decklid is attached to the vehicle body with at least one, preferably a pair of laterally spaced hinges. Currently, the decklid hinges are of a goose-neck type for allowing motion of the decklid from a fully open position to a fully closed position. However, these goose-neck hinges typically require the use of additional hinge bumpers or gas struts. For traditional hinge bumpers, these bumpers are attached directly to a goose-neck shaped member below a hinge box and have significantly more rebound that causes the decklid to oscillate toward a partial closing condition, before again cycling up to an open position, which is undesired. For gas struts, the gas struts provide decklid opening force and also provide a dampened full open stop. However, gas struts are more costly than traditional hinge bumpers, which is undesired.

Therefore, it is desirable to provide a gooseneck hinge for a closure of a vehicle that eliminates the need for hinge bumpers and gas struts. It is also desirable to provide a gooseneck hinge that reduces rebound response time and rebound travel. Therefore, there is a need in the art to provide a gooseneck hinge for a vehicle that meets these desires.

SUMMARY OF THE INVENTION

Accordingly, the present invention is a gooseneck hinge assembly for a closure of a vehicle including a body side strap adapted to be connected to a vehicle body of the vehicle and a closure side strap having a gooseneck shape adapted to be connected to a decklid for closing an opening in the vehicle body. The gooseneck hinge assembly also includes a pivot pin pivotally connecting the closure side strap and the body side strap to allow rotational movement therebetween. The gooseneck hinge assembly further includes a wedge bumper interconnecting the body side strap and the closure side strap to allow the decklid to free rise to a fully open position and to dampen an impact of the closure side strap.

One advantage of the present invention is that a new gooseneck hinge assembly is provided for a closure such as a decklid or liftgate of a vehicle. Another advantage of the present invention is that the gooseneck hinge assembly incorporates a wedge bumper that significantly reduces a rebound response time and rebound travel. Yet another advantage of the present invention is that the gooseneck hinge assembly improves operator opening for vehicle closures such as decklids or liftgates on a vehicle. Still another advantage of the present invention is that the gooseneck hinge assembly reduces mass and cost including assembly labor.

Other features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
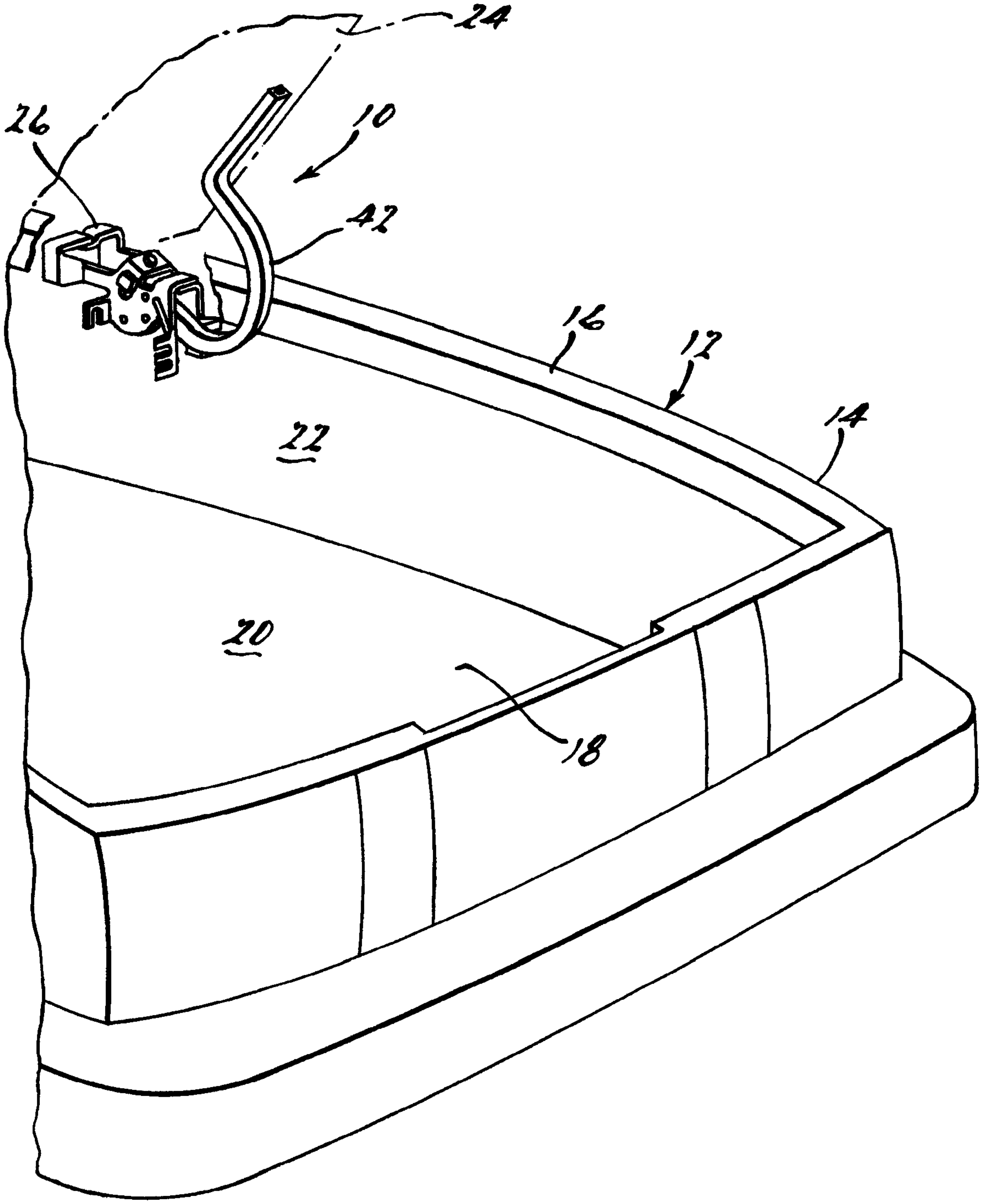
FIG. 1 is a perspective view of a gooseneck hinge assembly, according to the present invention, illustrated in operational relationship with a vehicle.

Referring to the drawings and in particular FIG. 1, one embodiment of a gooseneck hinge assembly 10, according to the present invention, is shown for a vehicle such as an automotive vehicle, generally indicated at 12. Such vehicles 12 typically include a vehicle body 14 (partially shown) forming a trunk or rear compartment 16. The rear compartment 16 has an opening such as a recess 18 therein. The recess 18 is formed by a floorpan 20 and side walls 22 extending upwardly from the floorpan 20 and generally perpendicular thereto. The vehicle body 14 also includes a closure such as a decklid 24 closing the recess 18. The decklid 24 is attached to the rear compartment 16 of the vehicle body 14 by at least one, preferably a pair of laterally spaced gooseneck hinge assemblies 10. It should be appreciated that only one gooseneck hinge assembly 10 is illustrated in FIG. 1 and will be subsequently described. It should also be appreciated that, except for the gooseneck hinge assembly 10, the vehicle 12 is conventional and known in the art.

Figure 2:
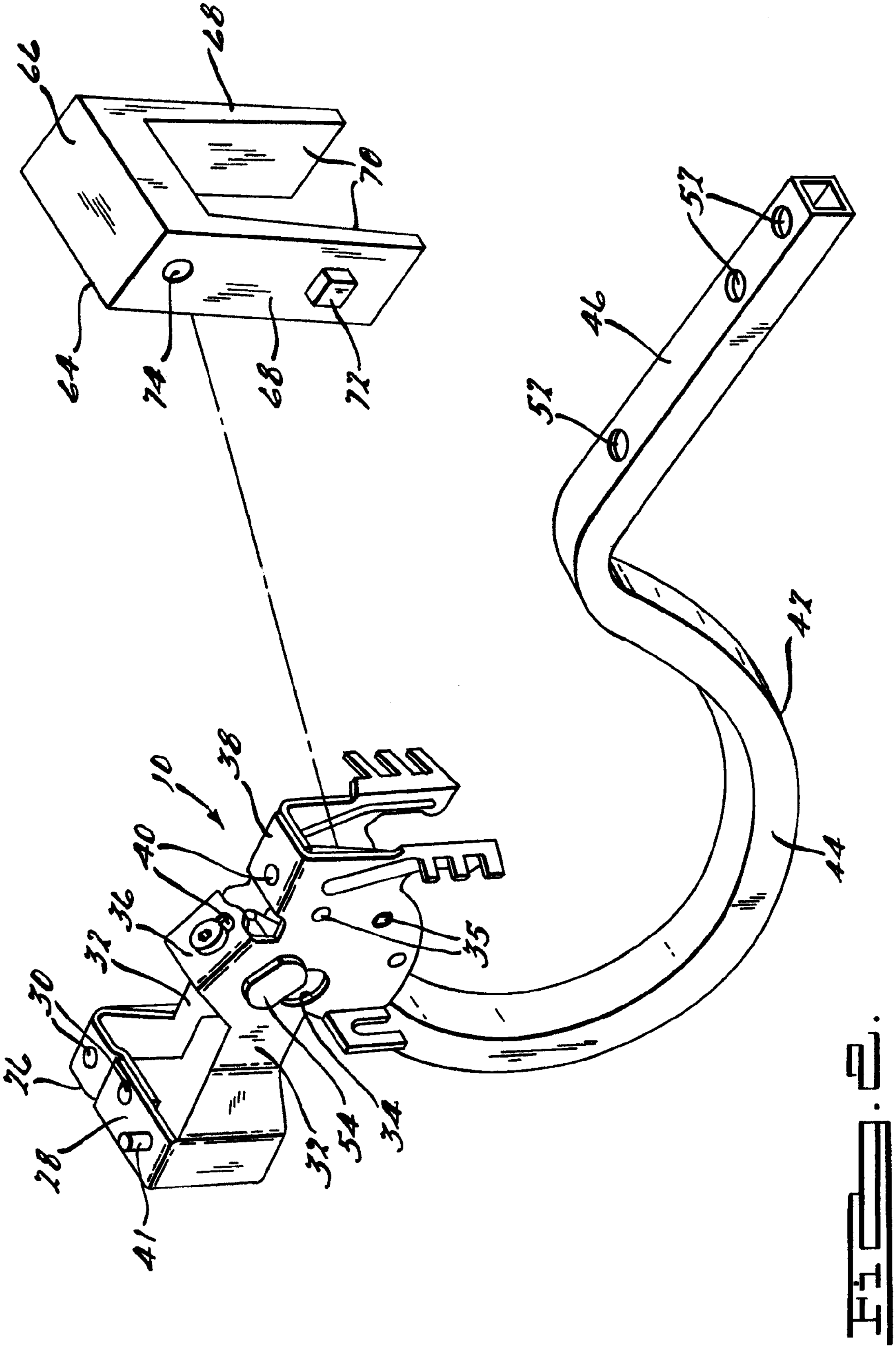
FIG. 2 is an exploded perspective view of the gooseneck hinge assembly of FIG. 1.
Figure 3:
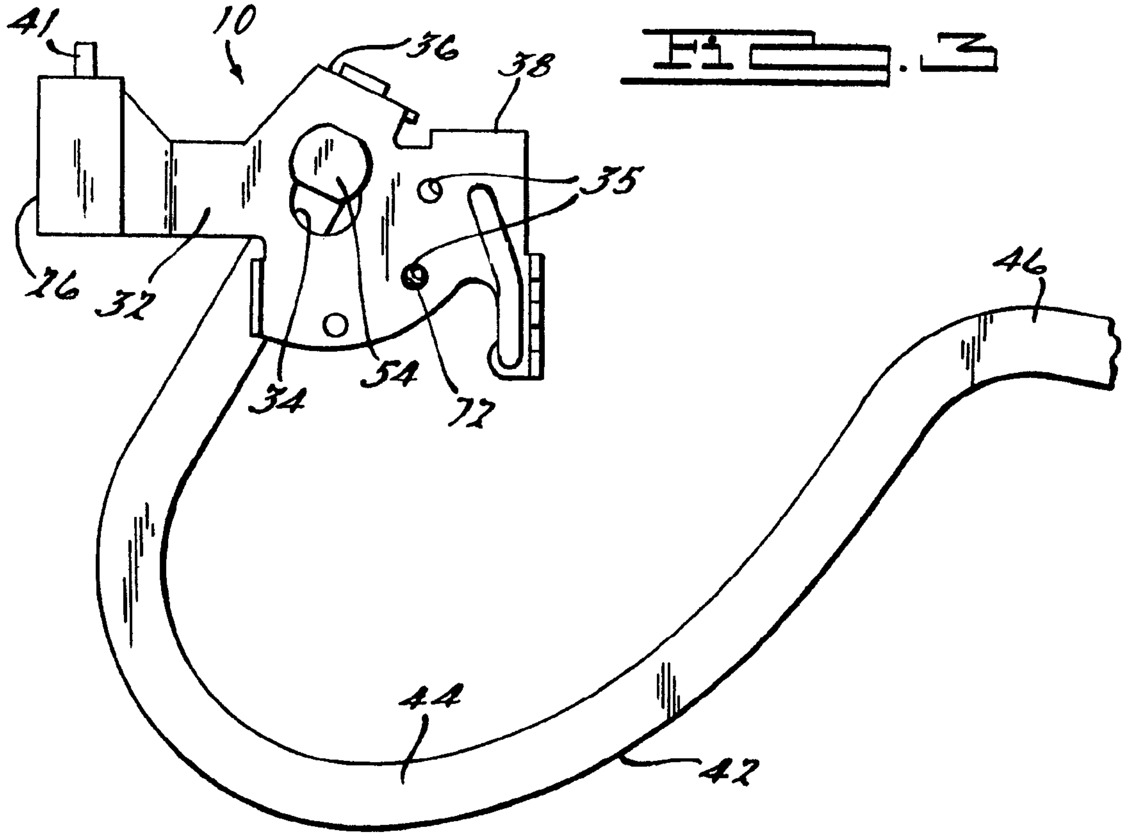
FIG. 3 is an elevational view of the gooseneck hinge assembly of FIG. 1.
Figure 4:
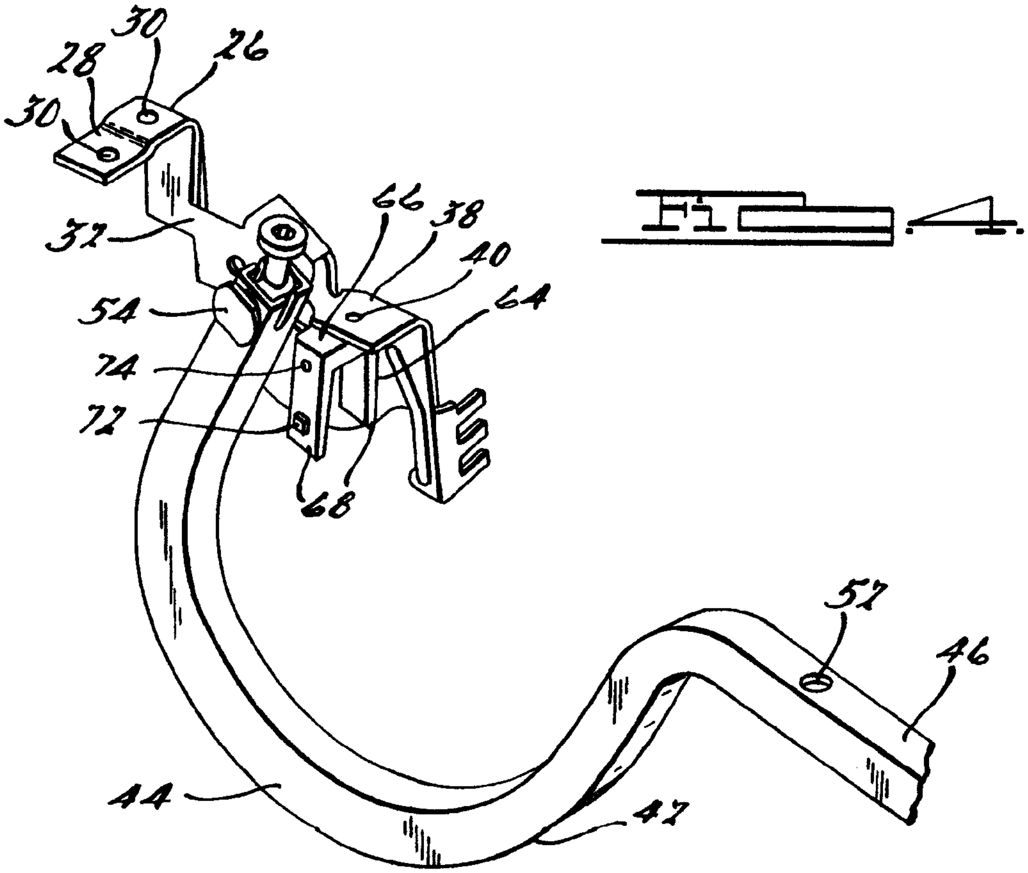
FIG. 4 is a perspective view of a portion of the gooseneck hinge assembly of FIG. 1.

Referring to FIGS. 2 through 4, the gooseneck hinge assembly 10 includes a body side bracket or strap 26 to be mounted to the vehicle body 14. The body side strap 26 is generally rectangular in shape. The body side strap 26 has a base portion 28 with a generally inverted "U" shape. The base portion 28 has at least one, preferably a plurality of apertures 30 extending therethrough for a function to be described. The body side strap 26 also has a pair of opposed side portions 32 extending longitudinally from the base portion 28. Each of the side portions 32 has at least one enlarged aperture 34 and a plurality of tooling apertures 35 extending therethrough for a function to be described. The body side strap 26 also has a first support portion 36 extending laterally between the side portions 32 and a second support portion 38 spaced longitudinally from the first support portion 36 and extending laterally between the side portions 32. The first support portion 36 and second support portion 38 each have a generally inverted "U" shape. Each of the first support portion 36 and second support portion 38 has at least one, preferably a plurality of apertures 40 extending therethrough for a function to be described.

The gooseneck hinge assembly 10 also includes at least one, preferably a plurality of fasteners 41 such as bolts to attach the body side strap 26 to the vehicle body 14. The fasteners 41 extend through some of the apertures 30 and 40 in the body side strap 26 and corresponding apertures (not shown) in the vehicle body 14 and are engaged by nuts (not shown) to prevent the fasteners from disengaging the apertures 30 and 40. The body side strap 26 is made of a rigid material such as metal. The body side strap 26 may be formed in one or more pieces joined together by a suitable mechanism such as welding. The body side strap 26 is integral and one-piece. It should be appreciated that the fasteners 41 are conventional and known in the art.

The gooseneck hinge assembly 10 further includes a closure side bracket or strap 42 to allow the decklid 24 to be attached to the body side strap 26. The closure side strap 42 has a generally "gooseneck" shape. The closure side strap 42 is a hollow member having a generally rectangular cross-sectional shape. The closure side strap 42 has a generally arcuate base portion 44 and an attachment portion 46 extending longitudinally from one end of the base portion 44. The base portion 44 may include at least one, preferably a plurality of apertures (not shown) extending therethrough near one end thereof for a function to be described. The base portion 44 may also have a pair of opposed slots (not shown) extending therein from one end thereof on sides adjacent the apertures. The attachment portion 46 includes at least one, preferably a plurality of apertures 52 extending therethrough for a function to be described.

The gooseneck hinge assembly 10 includes at least one, preferably a plurality of fasteners (not shown) such as bolts to attach the closure side strap 42 to the decklid 24. The fasteners extend through some of the apertures 52 in the attachment portion 46 and corresponding apertures (not shown) in the decklid 24 and are engaged by nuts (not shown) to prevent the fasteners from disengaging the apertures. The closure side strap 42 is made of a rigid material such as metal. The closure side strap 42 is integral and one-piece. It should be appreciated that the fasteners are conventional and known in the art.

The gooseneck hinge assembly 10 also includes at least one first or pivot pin 54 to pivotally attach the closure side strap 42 to the body side strap 26 at a forward end thereof. The pivot pin 54 includes a head portion extending radially, a shaft portion extending generally axially from the head portion, and a flange portion extending radially outwardly near one end thereof. The shaft portion extends through a pair of opposed apertures 34 of the body side strap 26 and a pair of opposed apertures (not shown) of the closure side strap 42 such that the head portion is disposed on one side of the body side strap 26 and the flange portion is disposed on the other side of the body side strap 26. The pivot pin 54 is made of a rigid material such as metal.

The gooseneck hinge assembly 10 also includes a bumper 64 to allow the decklid 24 to free rise to a fully open position and to dampen the impact of the closure side strap 42. The bumper 64 is of wedge type. The bumper 64 has a generally inverted "U" shape. The bumper 64 has a base wall 66 extending laterally and a pair of opposed side walls 68 extending generally vertically or perpendicularly from the base wall 66. The side walls 68 have inner surfaces 70 that are tapered or inclined from the base wall 66 toward a free end thereof. In one embodiment, the bumper 64 may include at least one, preferably a plurality of projections 72 extending laterally from the side walls 68. The bumper 64 may also include at least one, preferably a plurality of apertures 74 extending through the side walls 68. The bumper 64 is disposed between the side walls 32 of the body side strap 26. The apertures 74 are aligned with corresponding apertures 35 in the side walls 32 of the body side strap 26 and a pin (not shown) may be inserted through the apertures 74 in the bumper 64 and the apertures 35 of the body side strap 26 and staked or riveted thereto. The projections 72 of the bumper 64 extend through corresponding apertures 35 in the side walls 32 of the body side strap 26 and create an anti-rotation feature. The bumper 64 is made of a dampening material such as an elastomeric material. It should be appreciated that, any suitable mechanism, may be used to secure the bumper 64 between the side walls 32 of the body side strap 26 such as by an adhesive. It should also be appreciated that the gooseneck hinge assembly 10 may also include a torque rod (not shown) to power the decklid 24 to an open position by applying a force to the closure side strap 42 and to counterbalance the weight of the decklid 24.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A gooseneck hinge assembly for a decklid of a vehicle comprising:

a body side strap configured to be connected to a vehicle body of the vehicle, the body side strap including a support portion extending horizontally and a pair of spaced side walls extending downward normal to the support portion to form an inverted U-shape;

a closure side strap having a gooseneck shape configured to be connected to the decklid for closing an opening in the vehicle body, the closure side strap including an end pivotally mounted to the body side strap between the pair of side walls and a base portion adjacent to the end, the base portion having a pair of sides that are configured to be located between the side walls when the decklid is in an open position;

a pivot pin pivotally connecting said closure side strap and said body side strap to allow rotational movement therebetween; and a wedge bumper having a base wall extending horizontally and a pair of opposed bumper side walls extending generally normal to the base wall, the base wall abutting the support portion, each of the bumper side walls having an outer surface that abuts, along the entire vertical length, a respective one of the side walls of the body side strap, and each of the bumper side walls also having an inner surface, in opposed relation to the outer surface, that tapers inward along the entire inner surface from a free end toward the base wall such that a gap formed between the inner surfaces grows continually narrower from the free ends of the bumper side walls to the base wall, wherein the sides of the base portion of the closure side strap are configured to be spaced apart so as to become wedged between the inner surfaces of the bumper side walls as the decklid reaches the open position to dampen an impact of said closure side strap.

2. A gooseneck hinge assembly as set forth in claim 1 wherein said bumper includes at least one projection extending laterally from one of said side walls.

3. A gooseneck hinge assembly as set forth in claim 2 wherein said bumper includes at least one aperture extending through one of said side walls.

4. A gooseneck hinge assembly as set forth in claim 3 wherein said at least one aperture is aligned with a corresponding aperture in a side wall of said body side strap to receive a pin inserted through said at least one aperture and the aperture of said body side strap.

5. A gooseneck hinge assembly as set forth in claim 3 wherein said at least one projection extends through a corresponding aperture in one of the side walls of said body side strap to create an anti-rotation feature.

6. A gooseneck hinge assembly as set forth in claim 1 wherein said wedge bumper is made of a dampening material.

7. A closure assembly for a vehicle comprising:

a decklid; and a gooseneck hinge assembly including:

a body side strap configured to be connected to a vehicle body of the vehicle, the body side strap including a support portion extending horizontally and a pair of spaced side walls extending downward normal to the support portion to form an inverted U-shape;

a closure side strap having a gooseneck shape connected to the decklid for closing an opening in the vehicle body, the closure side strap including an end pivotally mounted to the body side strap between the pair of side walls and a base portion adjacent to the end, the base portion having a pair of sides that are configured to be located between the side walls when the decklid is in an open position;

a pivot pin pivotally connecting said closure side strap and said body side strap to allow rotational movement therebetween; and a wedge bumper having a base wall extending horizontally and a pair of opposed bumper side walls extending generally normal to the base wall, the base wall abutting the support portion, each of the bumper side walls having an outer surface that abuts, along the entire length, a respective one of the side walls of the body side strap, and each of the bumper side walls also having an inner surface, in opposed relation to the outer surface, that tapers inward along the entire vertical inner surface from a free end toward the base wall such that a gap formed between the inner surfaces grows continually narrower from the free ends of the bumper side walls to the base wall, wherein the sides of the base portion of the closure side strap are configured to be spaced apart so as to become wedged between the inner surfaces of the bumper side walls as the decklid reaches the open position to dampen an impact of said closure side strap.

8. A closure assembly as set forth in claim 7 wherein said bumper includes at least one projection extending laterally from one of said side walls.

9. A closure assembly as set forth in claim 8 wherein said bumper includes at least one aperture extending through one of said side walls.

10. A closure assembly as set forth in claim 9 wherein said at least one aperture is aligned with a corresponding aperture in a side wall of said body side strap to receive a pin inserted through said at least one aperture and the aperture of said body side strap.

11. A closure assembly as set forth in claim 10 wherein said at least one projection extends through a corresponding aperture in one of the side walls of said body side strap to create an anti-rotation feature.

12. A vehicle comprising:

a vehicle body having an aperture therein;

a decklid for closing said aperture; and a gooseneck hinge assembly including:

a body side strap connected to a vehicle body of the vehicle, the body side strap including a support portion extending horizontally and a pair of spaced side walls extending downward normal to the support portion to form an inverted U-shape;

a closure side strap having a gooseneck shape connected to the decklid for closing the aperture in the vehicle body, the closure side strap including an end pivotally mounted to the body side strap between the pair of side walls and a base portion adjacent to the end, the base portion having a pair of sides that are configured to be located between the side walls when the decklid is in an open position;

a pivot pin pivotally connecting said closure side strap and said body side strap to allow rotational movement therebetween; and a wedge bumper having a base wall extending horizontally and a pair of opposed bumper side walls extending generally normal to the base wall, the base wall abutting the support portion, each of the bumper side walls having an outer surface that abuts, along the entire length, a respective one of the side walls of the body side strap, and each of the bumper side walls also having an inner surface, in opposed relation to the outer surface, that tapers inward along the entire vertical inner surface from a free end toward the base wall such that a gap formed between the inner surfaces grows continually narrower from the free ends of the bumper side walls to the base wall, wherein the sides of the base portion of the closure side strap are configured to be spaced apart so as to become wedged between the inner surfaces of the bumper side walls as the decklid reaches the open position to dampen an impact of said closure side strap.

* * * * *